US 11,901,792 B2

(12) United States Patent
Kamizato

(10) Patent No.: US 11,901,792 B2
(45) Date of Patent: Feb. 13, 2024

(54) BUS BAR UNIT, STATOR, AND MOTOR

(71) Applicant: Nidec Corporation, Kyoto (JP)

(72) Inventor: Ryo Kamizato, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 181 days.

(21) Appl. No.: 17/592,537

(22) Filed: Feb. 4, 2022

(65) Prior Publication Data
US 2022/0271597 A1    Aug. 25, 2022

(30) Foreign Application Priority Data
Feb. 19, 2021    (JP) ................. 2021-025473

(51) Int. Cl.
*H02K 3/50*     (2006.01)
*H02K 3/52*     (2006.01)
*H02K 5/22*     (2006.01)
*H02K 3/46*     (2006.01)

(52) U.S. Cl.
CPC ............... *H02K 5/225* (2013.01); *H02K 3/46* (2013.01); *H02K 3/50* (2013.01); *H02K 3/52* (2013.01); *H02K 2203/09* (2013.01)

(58) Field of Classification Search
CPC ...... H02K 3/50; H02K 3/522; H02K 2203/09; H02K 3/52; H02K 5/225; H02K 3/46

USPC .......................................................... 310/71
See application file for complete search history.

(56) References Cited

U.S. PATENT DOCUMENTS

| 2015/0137637 A1* | 5/2015 | Jang ................. H02K 3/522 |
| | | 29/598 |
| 2016/0241098 A1* | 8/2016 | Fukunaga ......... H02K 15/0056 |
| 2020/0153302 A1* | 5/2020 | Yoshida .............. H01R 25/162 |

FOREIGN PATENT DOCUMENTS

JP     6706583 B2     6/2020

* cited by examiner

*Primary Examiner* — Alexander A Singh
(74) *Attorney, Agent, or Firm* — Keating & Bennett, LLP

(57) ABSTRACT

A bus bar assembly includes a bus bar holder and bus bars each including a main line portion extending in a plane perpendicular or substantially perpendicular to a center axis in a posture in which a plate surface is oriented in an axial direction, and a connection terminal portion connected to an end portion of the main line portion. When viewed in the axial direction as a symmetry axis, the main line portion of the first U-phase bus bar and the main line portion of the second U-phase bus bar, the main line portion of the first V-phase bus bar and the main line portion of the second V-phase bus bar, and the main line portion of the first W-phase bus bar and the main line portion of the second W-phase bus bar, each have a shape line-symmetric to each other.

14 Claims, 4 Drawing Sheets

BUS BAR UNIT, STATOR, AND MOTOR

CROSS-REFERENCE TO RELATED APPLICATIONS

The present application claims priority under 35 U.S.C. § 119 to Japanese Patent Application No. 2021-025473, filed on Feb. 19, 2021, the entire contents of which are hereby incorporated herein by reference.

1. FIELD OF THE INVENTION

The present disclosure relates to a bus bar assembly, a stator, and a motor.

2. BACKGROUND

In a three-phase motor, a motor provided with redundancy by a connection configuration of a plurality of systems is known. A bus bar assembly having a plurality of bus bars is used for connection between coils inside the motor.

In a motor having a connection configuration of a plurality of systems, since coils are connected independently for each system, the number of bus bars to be used increases.

SUMMARY

According to one example embodiment of the present disclosure, a bus bar assembly applicable to a stator with a two-system connection configuration includes a bus bar holder on one side in an axial direction of a stator core located around a center axis of the stator, and plate-shaped conductor bus bars fixed to the bus bar holder. The bus bars include a first U-phase bus bar and a second U-phase bus bar defining a U-phase bus bar group, a first V-phase bus bar and a second V-phase bus bar defining a V-phase bus bar group, and a first W-phase bus bar and a second W-phase bus bar defining a W-phase bus bar group. Each of the bus bars includes a main line portion extending in a plane perpendicular or substantially perpendicular to a center axis in a posture in which a plate surface is oriented in the axial direction, and a connection terminal portion connected to an end portion of the main line portion. With a first virtual line passing through the center axis of the stator when viewed in the axial direction as a symmetry axis, the main line portion of the first U-phase bus bar and the main line portion of the second U-phase bus bar have a shape line-symmetric to each other, the main line portion of the first V-phase bus bar and the main line portion of the second V-phase bus bar have a shape line-symmetric to each other, and the main line portion of the first W-phase bus bar and the main line portion of the second W-phase bus bar have a shape line-symmetric to each other.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described with reference to the drawings.

A motor 1 according to an example embodiment will be described with reference to FIGS. 1 to 4.

Figure 1:
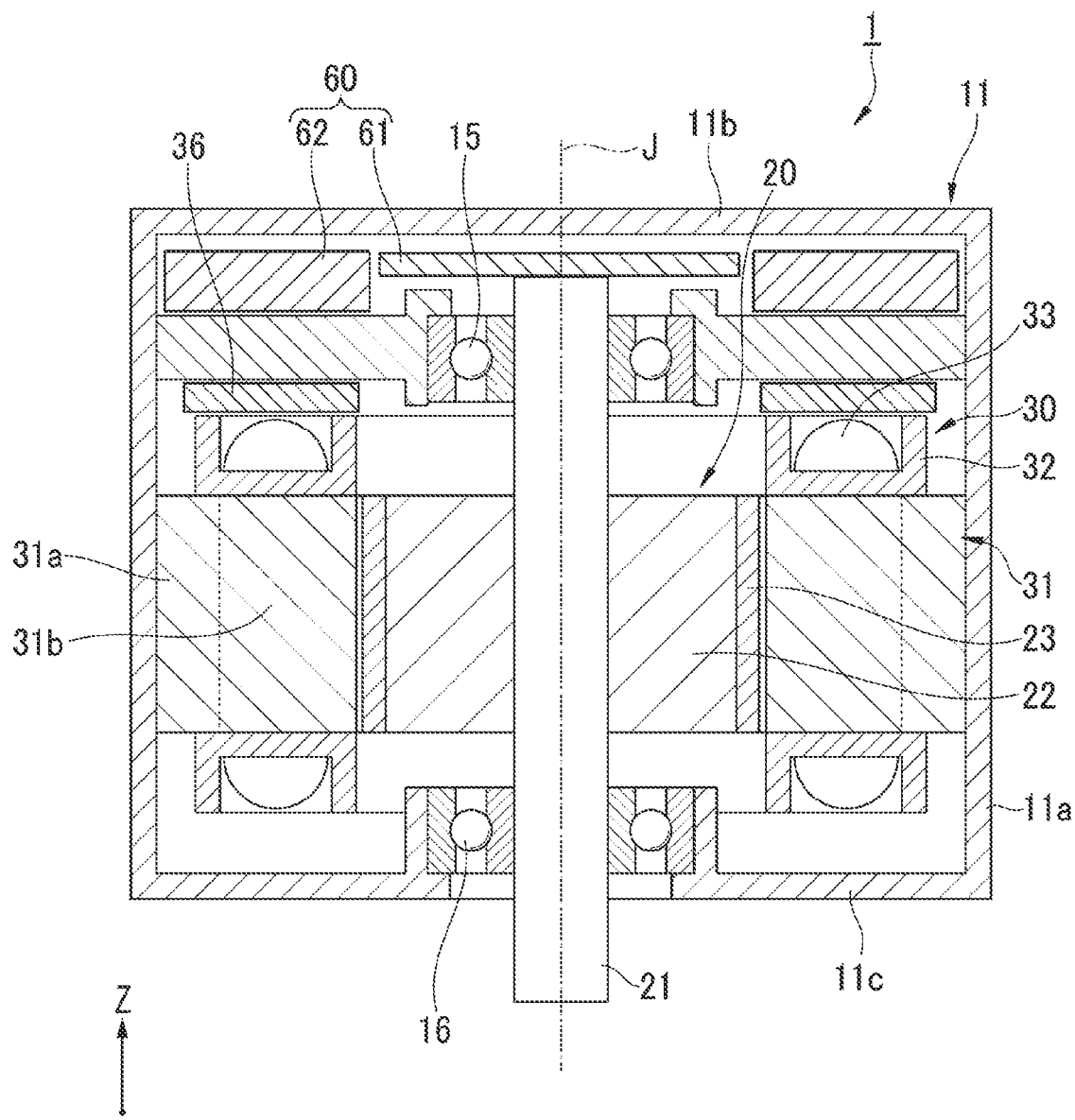
FIG. 1 is a sectional view of a motor according to an example embodiment of the present disclosure.

In the present example embodiment, a direction in which a center axis J of the motor 1 illustrated in FIG. 1 extends is simply referred to as an "axial direction". In the present example embodiment, the axial direction is a vertical direction. In the following example embodiment, an upper side (+Z) corresponds to one side in the axial direction, and a lower side (−Z) corresponds to the other side in the axial direction. A radial direction about the center axis J is simply referred to as a "radial direction". In the radial direction, a direction approaching the center axis J is referred to as a radial inside, and a direction separating from the center axis J is referred to as a radial outside. In the present example embodiment, the radial inside corresponds to one radial direction side, and the radial outside corresponds to the other radial direction side. A circumferential direction centered on the center axis J is simply referred to as a "circumferential direction".

The vertical direction, the upper side, and the lower side are merely names for describing a relative positional relationship between the respective units, and an actual layout relationship and the like may be other than the layout relationship indicated by these names.

The motor 1 of the present example embodiment is mounted on, for example, an electric power steering device (not illustrated). The electric power steering device is mounted on a steering mechanism of wheels of an automobile. The electric power steering device is a device that reduces steering force by a motor.

As illustrated in FIG. 1, the motor 1 of the present example embodiment includes a rotor 20 centered on the center axis J, a stator 30 disposed radially outside the rotor 20, a housing 11, a plurality of bearings 15 and 16, and a rotation detection unit 60 that detects rotation of the rotor 20. The rotation detection unit 60 is, for example, a resolver. The rotation detection unit 60 includes a resolver rotor 61 and a resolver stator 62. The rotation detection unit 60 is not limited to the resolver, and may be a system using a Hall element or an MR element.

The motor 1 is an inner rotor type motor. The rotor 20 rotates about the center axis J with respect to the stator 30. Although not particularly illustrated, the motor 1 may include a substrate that controls the rotation of the rotor 20.

The housing 11 accommodates therein the rotor 20 and the stator 30. The housing 11 is tubular extending in the axial direction. The housing 11 includes a circumferential wall 11a, a top wall 11b, a bottom wall 11c, and a bearing holding wall portion 11d. The circumferential wall 11a is cylindrical extending in the axial direction. The top wall 11b closes an upper opening of the circumferential wall 11a. The bottom wall 11c closes a lower opening of the circumferential wall 11a. The bottom wall 11c holds the bearing 16. The bearing holding wall portion 11d is fixed to the circumferential wall 11a. The bearing holding wall portion 11d holds the bearing 15.

The rotor 20 includes a shaft 21, a rotor core 22, and a magnet 23. The shaft 21 has a columnar shape extending in the axial direction. The shaft 21 may be cylindrical extending in the axial direction. The shaft 21 is supported by the plurality of bearings 15 and 16 so as to be rotatable about the center axis J. The plurality of bearings 15 and 16 are disposed at intervals in the axial direction, and are supported by the housing 11. That is, the shaft 21 is supported by the housing 11 via the plurality of bearings 15 and 16.

The rotor core 22 is tubular extending in the axial direction. An outer diameter of the rotor core 22 is larger than that of the shaft 21. The rotor core 22 has a smaller axial length than the shaft 21. An inner circumferential surface of the rotor core 22 is fixed to an outer circumferential surface of the shaft 21. The rotor core 22 is fixed to the shaft 21 by press fitting, bonding, or the like. The rotor core 22 is located between the pair of bearings 15 and 16 in the axial direction. The magnet 23 is fixed to an outer peripheral portion of the rotor core 22.

The stator 30 is radially opposed to the rotor 20 with a gap therebetween. The stator 30 surrounds the rotor 20 from the radial outside over the entire circumference in the circumferential direction. The stator 30 has a stator core 31, an insulator 32, a coil 33, and a bus bar assembly 36.

The stator core 31 has an annular shape centered on the center axis J. The stator core 31 is tubular extending in the axial direction. The stator core 31 surrounds the rotor 20 from the radial outside. The stator core 31 is configured by stacking a plurality of electromagnetic steel plates in the axial direction. The stator core 31 is fixed to an inner circumferential surface of the housing 11. The stator core 31 and the housing 11 are fixed by shrink fitting, press fitting, or the like, for example.

The stator core 31 includes a core back 31*a* and a plurality of teeth 31*b*. The core back 31*a* is cylindrical about the center axis J. A radial outside surface of the core back 31*a* is fixed to an inner circumferential surface of the circumferential wall 11*a*. The teeth 31*b* extend from a radial inside surface of the core back 31*a* toward the radial inside. The plurality of teeth 31*b* are disposed at intervals in the circumferential direction. A radial inside surface of each of the teeth 31*b* faces a radial outside surface of the rotor 20 with a gap therebetween.

The insulator 32 is attached to the stator core 31. The insulator 32 is made of an insulating material. For example, the insulator 32 is made of resin. The insulator 32 is attached to each of the plurality of teeth 31*b*. The coil 33 is attached to the stator core 31 via the insulator 32. A plurality of coils 33 are provided side by side in the circumferential direction.

The motor 1 of the present example embodiment is a three-phase motor. The three phases are a U phase, a V phase, and a W phase. In the case of the three-phase motor, the U-phase, V-phase, and W-phase coils 33 are electrically connected to the bus bar assembly 36.

As illustrated in FIG. 1, the bus bar assembly 36 is located on the upper side (+Z side) of the stator core 31. In the case of the present example embodiment, the bus bar assembly 36 is located between the stator core 31 and the bearing holding wall portion 11*d*. The bus bar assembly 36 may be located above the bearing holding wall portion 11*d*.

Figure 2:
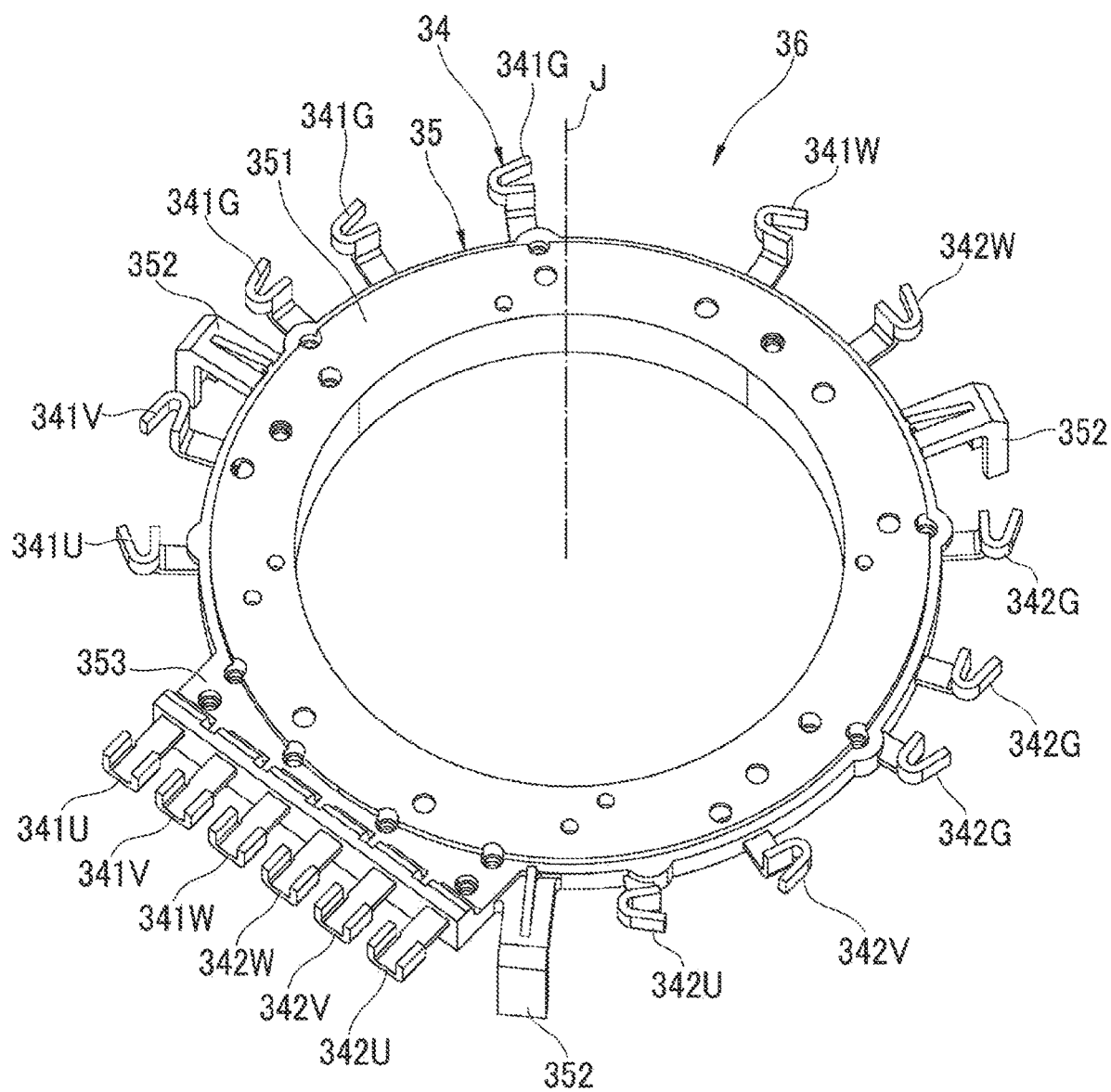
FIG. 2 is a perspective view of a bus bar assembly according to an example embodiment of the present disclosure.

As illustrated in FIG. 2, the bus bar assembly 36 includes a bus bar group 34 including a plurality of bus bars, and a bus bar holder 35 that holds the bus bar group 34. The bus bar group 34 includes eight bus bars 341U, 341V, 341W, 341G, 342U, 342V, 342W, and 342G. In the present example embodiment, the bus bar group 34 is insert-molded in the bus bar holder 35.

Figure 3:
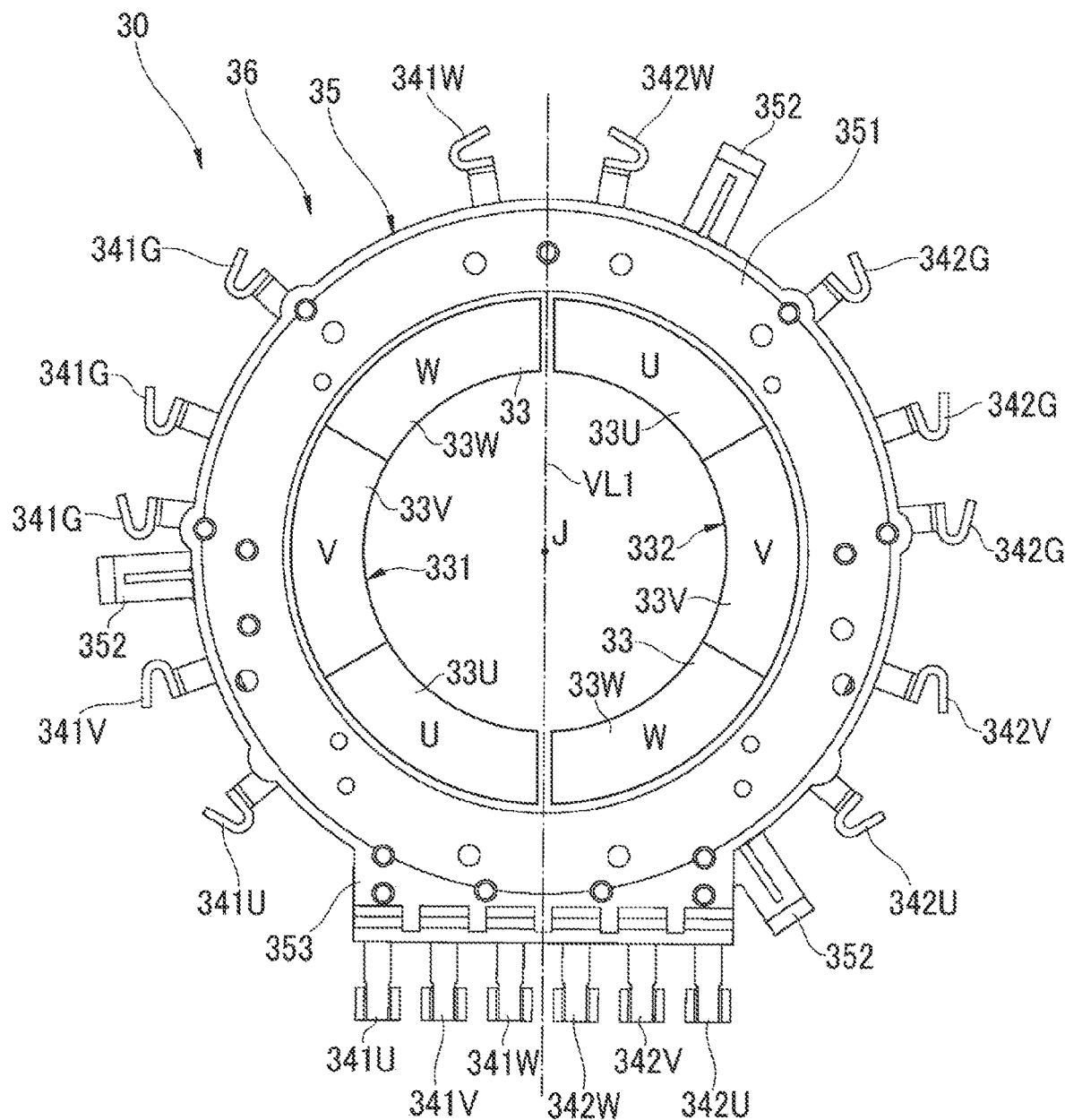
FIG. 3 is a plan view of the bus bar assembly.
Figure 4:
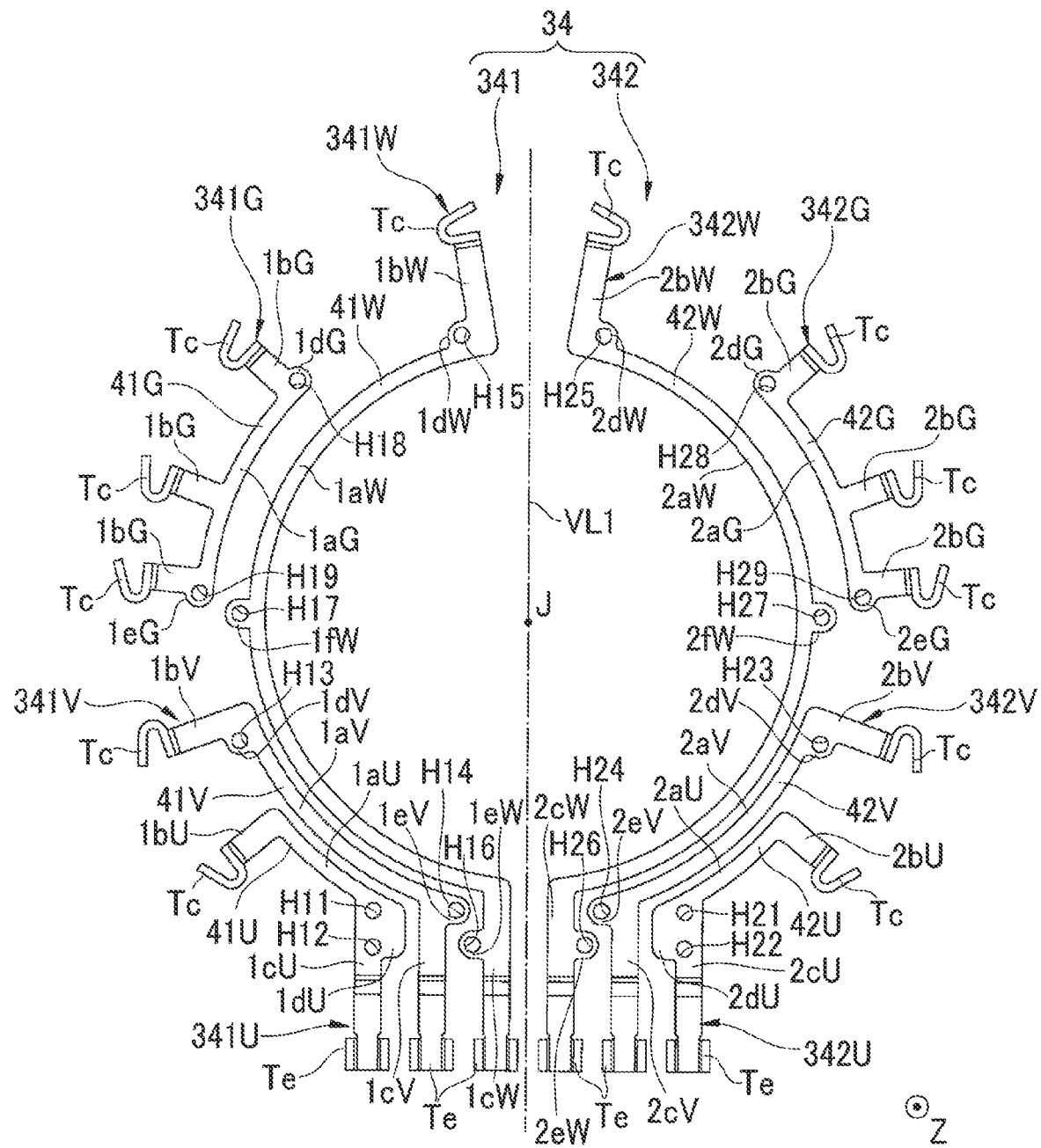
FIG. 4 is a plan view illustrating a bus bar group according to an example embodiment of the present disclosure.

As illustrated in FIG. 3, the bus bar holder 35 includes an annular holder body 351 when viewed from the axial direction, three support leg portions 352 protruding to the radial outside from an outer circumferential surface of the holder body 351, and a connector portion 353 protruding to the radial outside from the outer circumferential surface of the holder body 351. The bus bar holder 35 is made of a resin. End portions of the plurality of bus bars protrude to the radial outside from an outer circumferential surface of the bus bar holder 35. FIG. 4 illustrates the bus bar group 34 disposed to be held by the bus bar holder 35. Each of the bus bars constituting the bus bar group 34 extends along the circumferential direction inside the bus bar holder 35, and a connection terminal portion to be described later and at least a part of a coil wiring portion and an external power source wiring portion to be described later are exposed to the outside of the bus bar holder 35.

As illustrated in FIG. 3, the support leg portions 352 are disposed at three locations on the holder body 351. The three support leg portions 352 are disposed at intervals of 120° in the circumferential direction when viewed from the axial direction. The support leg portion 352 has an L shape that extends to the radial outside from the outer circumferential surface of the holder body 351 and is bent downward at an end portion on the radial outside. A lower end of the support leg portion 352 contacts the stator core 31 or the insulator 32. The support leg portion 352 positions the bus bar assembly 36 in the axial direction with respect to the stator core 31 or the insulator 32. The number of support leg portions 352 may be 2 or less or 4 or more. The bus bar holder 35 may be configured not to include the support leg portion 352.

The bus bar assembly 36 is configured to be connectable to three-phase coils of two systems. FIG. 3 schematically illustrates a coil configuration of the motor 1 of the present example embodiment. Six coils 33 are composed of two-system three-phase coils. That is, the motor 1 includes a first system coil group 331 including one set of U-phase coil 33U, V-phase coil 33V, and W-phase coil 33W, and a second system coil group 332 including another set of U-phase coil 33U, V-phase coil 33V, and W-phase coil 33W. The position and number of the coils 33 are not limited to the form illustrated in FIG. 3. For example, the U-phase coil 33U, the V-phase coil 33V, and the W-phase coil 33W may each include a plurality of coils.

As illustrated in FIG. 4, the bus bar group 34 includes a first system bus bar group 341 and a second system bus bar group 342. The first system bus bar group 341 includes a first U-phase bus bar 341U, a first V-phase bus bar 341V, a first W-phase bus bar 341W, and a first neutral point bus bar 341G. The second system bus bar group 342 includes a second U-phase bus bar 342U, a second V-phase bus bar 342V, a second W-phase bus bar 342W, and a second neutral point bus bar 342G.

That is, the bus bar assembly 36 includes a plurality of U-phase bus bars, a plurality of V-phase bus bars, and a plurality of W-phase bus bars. More specifically, the bus bar group 34 includes the first U-phase bus bar 341U and the second U-phase bus bar 342U constituting the U-phase bus bar group, the first V-phase bus bar 341V and the second V-phase bus bar 342V constituting the V-phase bus bar group, and the first W-phase bus bar 341W and the second W-phase bus bar 342W constituting the W-phase bus bar group.

Three coils of the first system coil group 331 illustrated in FIG. 3 are connected to the first system bus bar group 341. The U-phase coil 33U of the first system coil group 331 is connected to the first U-phase bus bar 341U and the first neutral point bus bar 341G. The V-phase coil 33V of the first system coil group 331 is connected to the first V-phase bus bar 341V and the first neutral point bus bar 341G. The W-phase coil 33W of the first system coil group 331 is connected to the first W-phase bus bar 341W and the first neutral point bus bar 341G.

The three coils of the second system coil group 332 are connected to the second system bus bar group 342. The U-phase coil 33U of the second system coil group 332 is connected to the second U-phase bus bar 342U and the second neutral point bus bar 342G. The V-phase coil 33V of the second system coil group 332 is connected to the second V-phase bus bar 342V and the second neutral point bus bar 342G. The W-phase coil 33W of the second system coil group 332 is connected to the second W-phase bus bar 342W and the second neutral point bus bar 342G.

As illustrated in FIG. 4, the first U-phase bus bar 341U includes a main line portion 41U extending in a plane orthogonal to the center axis in a posture in which a plate surface is oriented in the axial direction, a connection terminal portion Tc for coil connection located at an end portion on one side of the main line portion 41U, and a connection terminal portion Te for external power source connection located at an end portion on the other side of the main line portion 41U. The main line portion 41U has the plate surface facing the axial direction and a side surface facing a direction orthogonal to the axial direction. The main line portion 41U includes an arcuate portion 1aU extending in an arcuate shape along the circumferential direction around the center axis J, a coil wiring portion 1bU linearly extending from one end portion of the arcuate portion 1aU toward an outer peripheral side of the bus bar assembly 36, and an external power source wiring portion 1cU linearly extending from the other end portion of the arcuate portion 1aU toward the outer peripheral side of the bus bar assembly 36.

Similarly to the first U-phase bus bar 341U, the second U-phase bus bar 342U includes a main line portion 42U, a connection terminal portion Tc for coil connection, and a connection terminal portion Te for external power source connection. The main line portion 42U has a plate surface facing the axial direction and a side surface facing the direction orthogonal to the axial direction. The main line portion 42U includes an arcuate portion 2aU extending in an arcuate shape along the circumferential direction around the center axis J, a coil wiring portion 2bU linearly extending from one end portion of the arcuate portion 2aU toward the outer peripheral side of the bus bar assembly 36, and an external power source wiring portion 2cU linearly extending from the other end portion of the arcuate portion 2aU toward the outer peripheral side of the bus bar assembly 36.

The first V-phase bus bar 341V includes a main line portion 41V extending in a plane orthogonal to the center axis in a posture in which a plate surface is oriented in the axial direction, a connection terminal portion Tc for coil connection located at an end portion on one side of the main line portion 41V, and a connection terminal portion Te for external power source connection located at an end portion on the other side of the main line portion 41V. The main line portion 41V has the plate surface facing the axial direction and a side surface facing the direction orthogonal to the axial direction. The main line portion 41V includes an arcuate portion 1aV extending in an arcuate shape along the circumferential direction around the center axis J, a coil wiring portion 1bV linearly extending from one end portion of the arcuate portion 1aV toward the outer peripheral side of the bus bar assembly 36, and an external power source wiring portion 1cV linearly extending from the other end portion of the arcuate portion 1aV toward the outer peripheral side of the bus bar assembly 36.

Similarly to the first V-phase bus bar 341V, the second V-phase bus bar 342V includes a main line portion 42V, a connection terminal portion Tc for coil connection, and a connection terminal portion Te for external power source connection. The main line portion 42V has a plate surface facing the axial direction and a side surface facing the direction orthogonal to the axial direction. The main line portion 42V includes an arcuate portion 2aV extending in an arcuate shape along the circumferential direction around the center axis J, a coil wiring portion 2bV linearly extending from one end portion of the arcuate portion 2aV toward the outer peripheral side of the bus bar assembly 36, and an external power source wiring portion 2cV linearly extending from the other end portion of the arcuate portion 2aV toward the outer peripheral side of the bus bar assembly 36.

The first W-phase bus bar 341W includes a main line portion 41W extending in a plane orthogonal to the center axis in a posture in which a plate surface is oriented in the axial direction, a connection terminal portion Tc for coil connection located at an end portion on one side of the main line portion 41W, and a connection terminal portion Te for external power source connection located at an end portion on the other side of the main line portion 41W. The main line portion 41W has the plate surface facing the axial direction and a side surface facing the direction orthogonal to the axial direction. The main line portion 41W includes an arcuate portion 1aW extending in an arcuate shape along the circumferential direction around the center axis J, a coil wiring portion 1bW linearly extending from one end portion of the arcuate portion 1aW to the outer peripheral side of the bus bar assembly 36, and an external power source wiring portion 1cW linearly extending from the other end portion of the arcuate portion 1aW to the outer peripheral side of the bus bar assembly 36.

Similarly to the first W-phase bus bar 341W, the second W-phase bus bar 342W includes a main line portion 42W, a connection terminal portion Tc for coil connection, and a connection terminal portion Te for external power source connection. The main line portion 42W has a plate surface facing the axial direction and a side surface facing the direction orthogonal to the axial direction. The main line portion 42W includes an arcuate portion 2aW extending in an arcuate shape along the circumferential direction around the center axis J, a coil wiring portion 2bW linearly extending from one end portion of the arcuate portion 2aW to the outer peripheral side of the bus bar assembly 36, and an external power source wiring portion 2cW linearly extending from the other end portion of the arcuate portion 2aW to the outer peripheral side of the bus bar assembly 36.

The first neutral point bus bar 341G includes a main line portion 41G extending in a plane orthogonal to the center axis in a posture in which a plate surface is oriented in the axial direction, end portions on one side and the other side of the main line portion 41G, and three connection terminal portions Tc for coil connection located at a circumferential center of the main line portion 41G. The main line portion 41G has the plate surface facing the axial direction and a side surface facing the direction orthogonal to the axial direction. In addition, the main line portion 41G includes an arcuate portion 1aG extending in an arcuate shape along the circumferential direction around the center axis J, and three coil wiring portions 1bG linearly extending from one and the other end portions of the arcuate portion 1aG and the circumferential center toward the outer peripheral side of the bus bar assembly 36.

Similarly to the first neutral point bus bar 341G, the second neutral point bus bar 342G has a main line portion 42G and three connection terminal portions Tc for coil connection. The main line portion 42G has a plate surface facing the axial direction and a side surface facing the direction orthogonal to the axial direction. In addition, the main line portion 42G includes an arcuate portion 2aG extending in an arcuate shape along the circumferential direction around the center axis J, and three coil wiring portions 2bG linearly extending from one and the other end portions of the arcuate portion 2aG and the circumferential center toward the outer peripheral side of the bus bar assembly 36.

The bus bar assembly 36 may be configured not to include the first neutral point bus bar 341G and the second neutral point bus bar 342G. By using the first neutral point bus bar 341G and the second neutral point bus bar 342G, the wiring structure of the connecting wire for connecting the coils 33 to each other can be easily simplified, which is advantageous for improving productivity.

As illustrated in FIG. 4, the plurality of bus bars constituting the bus bar group 34 is disposed along the circumferential direction centered on the center axis J. Among the plurality of bus bars, the first W-phase bus bar 341W and the second W-phase bus bar 342W are located on the innermost side in the radial direction.

The first V-phase bus bar 341V and the first neutral point bus bar 341G are disposed radially outside the first W-phase bus bar 341W. The first U-phase bus bar 341U is disposed radially outside the first V-phase bus bar 341V.

The second V-phase bus bar 342V and the second neutral point bus bar 342G are disposed radially outside the second W-phase bus bar 342W. The second U-phase bus bar 342U is disposed radially outside the second V-phase bus bar 342V.

As illustrated in FIG. 4, the first system bus bar group 341 and the second system bus bar group 342 are disposed in two regions adjacent to each other with a first virtual line VL1 passing through the center axis J as a boundary when viewed in the axial direction. Furthermore, in the present example embodiment, the first U-phase bus bar 341U and the second U-phase bus bar 342U have a shape line-symmetric with the first virtual line VL1 as a symmetry axis, and are disposed at positions line-symmetric with the first virtual line VL1 as a symmetry axis. Similarly, the first V-phase bus bar 341V and the second V-phase bus bar 342V have a shape line-symmetric to each other with the first virtual line VL1 as a symmetry axis, and are disposed at line-symmetric positions. The first W-phase bus bar 341W and the second W-phase bus bar 342W have a shape line-symmetric to each other with the first virtual line VL1 as a symmetry axis, and are disposed at line-symmetric positions. The first neutral point bus bar 341G and the second neutral point bus bar 342G have a shape line-symmetric to each other with the first virtual line VL1 as a symmetry axis, and are disposed at line-symmetric positions.

The bus bar is manufactured by bending a blank obtained by punching a metal plate with a mold. In the present example embodiment, since the two bus bars disposed at symmetrical positions across the first virtual line VL1 have a shape line-symmetrical to each other, the two bus bars can be manufactured using a common blank. That is, the first U-phase bus bar 341U and the second U-phase bus bar 342U can be manufactured from a common blank. Similarly, the first V-phase bus bar 341V and the second V-phase bus bar 342V, the first W-phase bus bar 341W and the second W-phase bus bar 342W, and the first neutral point bus bar 341G and the second neutral point bus bar 342G can also be manufactured using a common blank.

According to the present example embodiment, the eight bus bars constituting the bus bar assembly 36 can be manufactured from four types of blanks. Therefore, the number of molds used for manufacturing the bus bar can be reduced, and the bus bar can be efficiently manufactured at low cost. The productivity of the bus bar assembly 36 can be improved.

In addition, in the present example embodiment, the bus bars having shapes line-symmetric to each other are disposed at line-symmetric positions with the first virtual line VL1 as a symmetry axis. According to this configuration, the first system bus bar group 341 and the second system bus bar group 342 are disposed at line-symmetric positions with the first virtual line VL1 as a symmetry axis. The bus bar holder 35 holding the bus bar group 34 can be easily formed into an annular shape close to a perfect circle, and can be easily disposed on the upper side of the annular stator core 31.

In the present example embodiment, both the shape and the arrangement of the pair of bus bars are line-symmetric with the first virtual line VL1 as a symmetry axis, but the present disclosure is not limited to this configuration. In the first U-phase bus bar 341U and the second U-phase bus bar 342U, the main line portion 41U and the main line portion 42U may have a shape line-symmetrical to each other with respect to the first virtual line VL1. The same applies to the first V-phase bus bar 341V and the second V-phase bus bar 342V, the first W-phase bus bar 341W and the second W-phase bus bar 342W, and the first neutral point bus bar 341G and the second neutral point bus bar 342G. When the main line portions have a line-symmetric shape, the blanks used for manufacturing the bus bars can be made common, and the manufacturing efficiency of the bus bars can be enhanced.

The shapes of the connection terminal portions Tc and Te, which are portions other than the main line portion, are changed according to a position and direction of a lead wire extending from the coil 33. For example, the first U-phase bus bar 341U and the second U-phase bus bar 342U may have different orientations of an opening of the connection terminal portion Tc for coil connection that grips the lead wire from the coil 33.

Even in this case, two blanks having different shapes only at portions where the connection terminal portions Tc and Te are formed can be manufactured only by sharing a punched shape from the metal plate and performing some cutting after the punching. Therefore, the number of molds for manufacturing a blank can be reduced.

In the present example embodiment, as illustrated in FIG. 4, the first U-phase bus bar 341U, the second U-phase bus bar 342U, the first V-phase bus bar 341V, the second V-phase bus bar 342V, the first W-phase bus bar 341W, the second W-phase bus bar 342W, the first neutral point bus bar 341G, and the second neutral point bus bar 342G are disposed at positions not overlapping each other when viewed from the axial direction. The eight bus bars are disposed at positions overlapping at least one other bus bar when viewed from the radial direction. In the case of the present example embodiment, the main line portions of the eight bus bars are disposed on a common plane in a posture in which the plate surfaces are oriented in the axial direction.

According to this configuration, the plurality of bus bars can be disposed at positions where the plurality of bus bars overlap each other when viewed from the radial direction, and the plurality of bus bars are disposed in a posture in which the plate surfaces are oriented in the axial direction, so that the thickness of the bus bar assembly 36 in the axial direction can be greatly reduced. By using the bus bar assembly 36 of the present example embodiment, it is possible to realize the stator 30 and the motor 1 which are compact in the axial direction.

As illustrated in FIG. 4, each of the bus bars constituting the bus bar group 34 has a widened portion protruding in a direction orthogonal to the axial direction from a side surface of the bus bar when viewed from the axial direction.

The first U-phase bus bar 341U has a widened portion 1$d$U protruding from a side surface of the external power source wiring portion 1$c$U to the external power source wiring portion 1$c$V side (right side in FIG. 4) at the intersection of the arcuate portion 1$a$U and the external power source wiring portion 1$c$U. The second U-phase bus bar 342U has a widened portion 2$d$U protruding from a side surface of the external power source wiring portion 2$c$U to the external power source wiring portion 2$c$V side (left side in FIG. 4) at the intersection between the arcuate portion 2$a$U and the external power source wiring portion 2$c$U.

The first U-phase bus bar 341U has two through holes H11 and H12 penetrating the main line portion 41U in a plate thickness direction (axial direction) at positions of the widened portion 1$d$U. The second U-phase bus bar 342U has two through holes H21 and H22 penetrating the main line portion 42U in the plate thickness direction at positions of the widened portion 2$d$U. The two through holes H11 and H12 of the first U-phase bus bar 341U are arranged along a direction in which the external power source wiring portion 1$c$U extends. The two through holes H21 and 22 of the second U-phase bus bar 342U are arranged along a direction in which the external power source wiring portion 2$c$U extends. The through holes H11 and H12 are holes into which support pins for fixing the respective bus bars in a mold are inserted when the bus bar group 34 is insert-molded in the bus bar holder 35. The same applies to other through holes H13 to H19 and through holes H23 to H29 described later.

The first V-phase bus bar 341V has a widened portion 1$d$V at a corner on an inner corner side at a position where the arcuate portion 1$a$V and the coil wiring portion 1$b$V intersect. The first V-phase bus bar 341V has a widened portion 1$e$V protruding from a side surface of the external power source wiring portion 1$c$V to the external power source wiring portion 1$c$W side (right side in FIG. 4) at the intersection of the arcuate portion 1$a$V and the external power source wiring portion 1$c$V. The first V-phase bus bar 341V has two through holes H13 and H14 penetrating the widened portions 1$d$V and 1$e$V in the plate thickness direction, respectively.

The second V-phase bus bar 342V has a widened portion 2$d$V at a corner on an inner corner side at a position where the arcuate portion 2$a$V and the coil wiring portion 2$b$V intersect. The second V-phase bus bar 342V has a widened portion 2$e$V protruding from a side surface of the external power source wiring portion 2$c$V to the external power source wiring portion 2$c$W side (left side in FIG. 4) at the intersection of the arcuate portion 2$a$V and the external power source wiring portion 2$c$V. The second V-phase bus bar 342V has two through holes H23 and H24 penetrating the widened portions 2$d$V and 2$e$V in the plate thickness direction, respectively.

The first W-phase bus bar 341W has a widened portion 1$d$W at a corner on an inner corner side at a position where the arcuate portion 1$a$W and the coil wiring portion 1$b$W intersect. The first W-phase bus bar 341W has a widened portion 1$e$W protruding from a side surface of the external power source wiring portion 1$c$W toward the external power source wiring portion 1$c$V (left side in FIG. 4) at the intersection of the arcuate portion 1$a$W and the external power source wiring portion 1$c$W. The first W-phase bus bar 341W has a widened portion 1$f$W protruding to the radial outside from a side surface of the arcuate portion 1$a$W at a central portion of the arcuate portion 1$a$W. The first W-phase bus bar 341W has three through holes H15, H16, and H17 penetrating the widened portions 1$d$W, 1$e$W, and 1$f$W in the plate thickness direction, respectively.

The second W-phase bus bar 342W has a widened portion 2$d$W at a corner on an inner corner side at a position where the arcuate portion 2$a$W and the coil wiring portion 2$b$W intersect. The second W-phase bus bar 342W has a widened portion 2$e$W protruding from a side surface of the external power source wiring portion 2$c$W toward the external power source wiring portion 2$c$V (left side in FIG. 4) at the intersection of the arcuate portion 2$a$W and the external power source wiring portion 2$c$W. The second W-phase bus bar 342W has a widened portion 2$f$W protruding to the radial outside from a side surface of the arcuate portion 2$a$W at a central portion of the arcuate portion 2$a$W. The second W-phase bus bar 342W has three through holes H25, H26, and H27 penetrating the widened portions 2$d$W, 2$e$W, and 2$f$W in the plate thickness direction, respectively.

The first neutral point bus bar 341G has a widened portion 1$d$G protruding outward in the circumferential direction from a corner where the arcuate portion 1$a$G and the coil wiring portion 1$b$G on one circumferential direction side are connected. The first neutral point bus bar 341G has a widened portion 1$e$G protruding outward in the circumferential direction from a corner where the arcuate portion 1$a$G and the coil wiring portion 1$b$G on the other circumferential direction side are connected. The first neutral point bus bar 341G has two through holes H18 and H19 penetrating the widened portions 1$d$G and 1$e$G in the plate thickness direction, respectively.

The second neutral point bus bar 342G has a widened portion 2$d$G protruding outward in the circumferential direction from a corner where the arcuate portion 2$a$G and the coil wiring portion 2$b$G on one circumferential direction side are connected. The second neutral point bus bar 342G has a widened portion 2$e$G protruding outward in the circumferential direction from a corner where the arcuate portion 2$a$G and the coil wiring portion 2$b$G on the other circumferential direction side are connected. The second neutral point bus bar 342G has two through holes H28 and H29 penetrating the widened portions 2$d$G and 2$e$G in the plate thickness direction, respectively.

According to the present example embodiment, since each of the bus bars belonging to the bus bar group 34 has the widened portion protruding in the direction orthogonal to the axial direction from the side surface of each of the bus bars when viewed from the axial direction, it is possible to suppress an increase in electric resistance of the bus bar even when the through hole is provided in the bus bar. In the present example embodiment, the through hole of the bus bar may be located in the widened portion of the bus bar like the through holes H13 to H19 and H23 to H29 illustrated in FIG. 4, or may be located in the vicinity of the widened portions 1$d$U and 2$d$U like the through holes H11, H12, H21, and H22. Since the through hole is configured to be located in the widened portion, an increase in electric resistance of the bus bar due to the through hole is substantially eliminated, so that the through hole for inserting the support pin can be disposed at an arbitrary position.

In the present example embodiment, the widened portion 1$d$V of the first V-phase bus bar 341V and the widened portion 2$d$V of the second V-phase bus bar 342V, and the widened portion 1dW of the first W-phase bus bar 341W and the widened portion 2dW of the second W-phase bus bar 342W are located inside the corner where each bus bar is bent. According to this configuration, rigidity of each bus bar can be enhanced. The bending of the bus bar can be reduced, and the effect of improving the yield of the bus bar assembly 36 and reducing the defect of the coil wiring can be obtained.

In the present example embodiment, the widened portions 1dV and 1eV of the first V-phase bus bar 341V and the widened portions 2dV and 2eV of the second V-phase bus bar 342V are located at both circumferential ends of the first V-phase bus bar 341V and the second V-phase bus bar 342V, respectively. Similarly, the widened portions 1dW and 1eW of the first W-phase bus bar 341W and the widened portions 2dW and 2eW of the second W-phase bus bar 342W are located at both circumferential ends of the first W-phase bus bar 341W and the second W-phase bus bar 342W, respectively.

According to these configurations, by providing the through hole in the widened portion, the through hole for inserting the support pin can be disposed at both ends of the elongated bus bar, so that even a relatively long bus bar can be stably held. The positional accuracy of the bus bar at the time of insert molding can be enhanced. The yield of the bus bar assembly 36 can be improved, and the defect of the coil wiring can also be reduced.

In the present example embodiment, the first U-phase bus bar 341U, the second U-phase bus bar 342U, the first V-phase bus bar 341V, the second V-phase bus bar 342V, the first W-phase bus bar 341W, and the second W-phase bus bar 342W have the external power source wiring portions 1cU, 2cU, 1cV, 2cV, 1cW, and 2cW extending in a direction along the first virtual line VL1 in a part of each of the main line portions 41U, 42U, 41V, 42V, 41W, and 42W. The connection terminal portions Te for external power source extend from distal ends of the external power source wiring portions 1cU, 2cU, 1cV, 2cV, 1cW, and 2cW. The plurality of external power source wiring portions 1cU, 2cU, 1cV, 2cV, 1cW, and 2cW are arranged in a direction orthogonal to the first virtual line VL1 when viewed in the axial direction. The external power source wiring portions 1cU, 2cU, 1cV, 2cV, 1cW, and 2cW are held by the connector portion 353 of the bus bar holder 35 illustrated in FIGS. 2 to 4. The distal end portions of the external power source wiring portions 1cU, 2cU, 1cV, 2cV, 1cW, and 2cW protrude from the connector portion 353 to the outer peripheral side of the bus bar assembly 36.

According to this configuration, since the plurality of external power source wiring portions 1cU, 2cU, 1cV, 2cV, 1cW, and 2cW are accommodated in a partial region in the circumferential direction of the bus bar holder 35, the external power source wiring portions can be disposed compactly. Since the plurality of external power source wiring portions are arranged along the first virtual line VL1, both the external power source wiring portions 1cU, 1cV, and 1cW of the first system bus bar group 341 and the external power source wiring portions 2cU, 2cV, and 2cW of the second system bus bar group 342 can be disposed in the vicinity of the first virtual line VL1. A connector to the external power source of two systems can be made compact.

As illustrated in FIG. 4, the external power source wiring portions 1cV and 1cW of the first system have the widened portions 1eV and 1eW protruding from the side surfaces facing each other, and the two widened portions 1eV and 1eW overlap each other when viewed from a direction in which the external power source wiring portions 1cV and 1cW extend.

Also in the second system, the external power source wiring portions 2cV and 2cW have the widened portions 2eV and 2eW protruding from the side surfaces facing each other, and the two widened portions 2eV and 2eW overlap each other when viewed from a direction in which the external power source wiring portions 2cV and 2cW extend.

According to these configurations, the two widened portions 1eV and 1eW are disposed in a gap between the external power source wiring portions 1cV and 1cW disposed adjacent to each other. Two widened portions 2eV and 2eW are disposed in a gap between the external power source wiring portions 2cV and 2cW. Since the widened portions 1eV, 1eW, 2eV, and 2eW can be efficiently disposed, the connector to the external power source can be made compact. In addition, since the width between the external power source wiring portions is not excessively increased, it is possible to suppress the occurrence of a resin molding defect in the gap between the external power source wiring portions.

In the present example embodiment, the widened portion 1dU of the first U-phase bus bar 341U is disposed between the adjacent external power source wiring portions 1cU and 1cV. The widened portion 2dU of the second U-phase bus bar 342U is disposed between the adjacent external power source wiring portions 2cU and 2cV. According to this configuration, it is possible to prevent a gap between the adjacent external power source wiring portions 1cU and 1cV and a gap between the adjacent external power source wiring portions 2cU and 2cV from becoming excessively large, and to suppress the occurrence of resin molding defects in the gap between the external power source wiring portions.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A bus bar assembly applicable to a stator including a two-system connection configuration, the bus bar assembly comprising:
   a bus bar holder on one side in an axial direction of a stator core located around a center axis of the stator; and
   plate-shaped conductor bus bars fixed to the bus bar holder; wherein
   the bus bars include:
   a first U-phase bus bar and a second U-phase bus bar defining a U-phase bus bar group;
   a first V-phase bus bar and a second V-phase bus bar defining a V-phase bus bar group; and
   a first W-phase bus bar and a second W-phase bus bar defining a W-phase bus bar group;
   each of the bus bars includes a main line portion extending in a plane perpendicular or substantially perpendicular to a center axis in a posture in which a plate surface is oriented in the axial direction, and a connection terminal portion connected to an end portion of the main line portion; and with a first virtual line passing through the center axis of the stator when viewed in the axial direction as a symmetry axis;

the main line portion of the first U-phase bus bar and the main line portion of the second U-phase bus bar have a shape line-symmetric to each other;

the main line portion of the first V-phase bus bar and the main line portion of the second V-phase bus bar have a shape line-symmetric to each other; and the main line portion of the first W-phase bus bar and the main line portion of the second W-phase bus bar have a shape line-symmetric to each other.

2. The bus bar assembly according to claim 1, wherein the first U-phase bus bar, the second U-phase bus bar, the first V-phase bus bar, the second V-phase bus bar, the first W-phase bus bar, and the second W-phase bus bar do not overlap each other when viewed from the axial direction, and are located at a position overlapping at least another one of the bus bars when viewed from a radial direction.

3. The bus bar assembly according to claim 2, wherein the main line portion of the first U-phase bus bar and the main line portion of the second U-phase bus bar are located at positions line-symmetric to each other with respect to the first virtual line;

the main line portion of the first V-phase bus bar and the main line portion of the second V-phase bus bar are located at positions line-symmetric to each other with respect to the first virtual line; and the main line portion of the first W-phase bus bar and the main line portion of the second W-phase bus bar are located at positions line-symmetric to each other with respect to the first virtual line.

4. The bus bar assembly according to claim 1, wherein the bus bars include a first neutral point bus bar and a second neutral point bus bar defining a neutral point bus bar group;

each of the first neutral point bus bar and the second neutral point bus bar includes a main line portion extending in a plane perpendicular or substantially perpendicular to a center axis in a posture in which a plate surface is oriented in the axial direction, and a connection terminal portion extending from an end portion of the main line portion; and a main line portion of the first neutral point bus bar and a main line portion of the second neutral point bus bar have a shape line-symmetric to each other with respect to the first virtual line.

5. The bus bar assembly according to claim 4, wherein the first neutral point bus bar, the second neutral point bus bar, the first U-phase bus bar, the second U-phase bus bar, the first V-phase bus bar, the second V-phase bus bar, the first W-phase bus bar, and the second W-phase bus bar do not overlap each other when viewed from the axial direction, and are located at positions overlapping at least another one of the bus bars when viewed from the radial direction.

6. The bus bar assembly according to claim 5, wherein the main line portion of the first neutral point bus bar and the main line portion of the second neutral point bus bar are located at positions line-symmetric to each other with respect to the first virtual line.

7. The bus bar assembly according to claim 1, wherein the bus bars have a widened portion protruding in a direction perpendicular or substantially perpendicular to the axial direction from a side surface of the bus bar when viewed from the axial direction in a portion where the plate surface opposes the axial direction.

8. The bus bar assembly according to claim 7, wherein the widened portion includes a through hole penetrating the bus bar in a plate thickness direction.

9. The bus bar assembly according to claim 7, wherein the widened portion is located at a corner where the main line portion is bent when viewed in the axial direction.

10. The bus bar assembly according to claim 7, wherein the widened portion is located at an end portion of the bus bar in a circumferential direction.

11. The bus bar assembly according to claim 1, wherein the first U-phase bus bar, the second U-phase bus bar, the first V-phase bus bar, the second V-phase bus bar, the first W-phase bus bar, and the second W-phase bus bar respectively include external power source wiring portions extending in a direction along the first virtual line in a portion of each main line portion;

the connection terminal portion of an external power source extends from a distal end of the external power source wiring portions; and the external power source wiring portions are arranged in a direction perpendicular or substantially perpendicular to the first virtual line when viewed in the axial direction.

12. The bus bar assembly according to claim 11, wherein the bus bars include a widened portion protruding in a direction perpendicular or substantially perpendicular to the axial direction from a side surface of the bus bar when viewed from the axial direction in a portion of a portion where the plate surface opposes the axial direction;

at least two of the external power source wiring portions among the external power source wiring portions include the widened portions protruding from side surfaces opposing each other; and the two widened portions overlap each other when viewed from a direction in which the external power source wiring portion extends.

13. A stator comprising the bus bar assembly according to claim 1.

14. A motor comprising the stator according to claim 13.